Patented Sept. 18, 1945

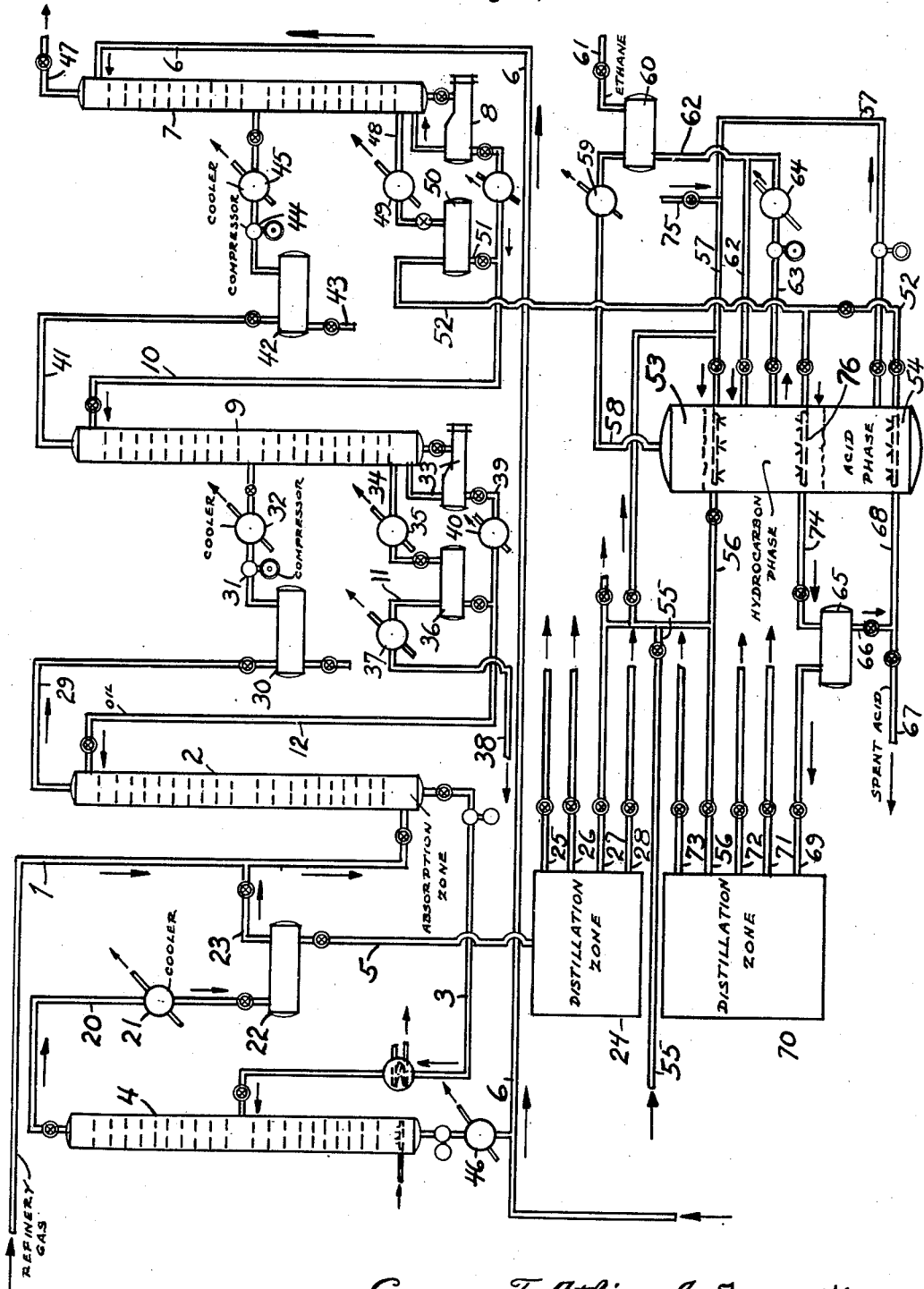

2,385,123

UNITED STATES PATENT OFFICE 2,385,123

ALKYLATION OF ETHYLENE

George T. Atkins, Jr., Highlands, Tex., assignor to Standard Oil Development Company, a corporation of Delaware Application August 1, 1941, Serial No. 404,981

10 Claims. (Cl. 260—683.4)

The present invention is concerned with the production of normally liquid saturated hydrocarbons suitable for use as motor fuels. The invention more particularly relates to a method of alkylating saturated hydrocarbons containing at least one tertiary carbon atom per molecule with ethylene. In accordance with the present invention, ethylene is alkylated by utilizing, in conjunction with the saturated hydrocarbon containing at least one tertiary carbon atom in the molecule, a quantity of a higher boiling olefin.

It is known in the art that saturated hydrocarbons containing a tertiary carbon atom, hereinafter referred to as tertiary hydrocarbons, will react with olefins, in the presence of a suitable catalyst such as concentrated mineral acids, resulting in the production of a wide range of higher boiling hydrocarbon products. The nature of these reactions varies widely with the reaction conditions and with the particular type and character of feed materials employed.

The feed stocks which are employed in producing these motor fuels vary considerably. The isoparaffinic constituent of the feed stock usually comprises isobutane, isopentane and similar higher branched chain homologues containing at least one tertiary carbon atom per molecule. The olefinic reactants generally comprise propylene, normal butylenes, isobutylene, trimethyl ethylene, the isomeric pentenes and similar higher mono-olefinic hydrocarbons of either a straight chain or branched chain structure. Mixtures of two or more of these mono-olefins are likewise employed. Under certain operations the feed material comprises various refinery cuts segregated from various cracking and distillation operations, such as propane, butane and pentane cuts which comprise constituents boiling in the respective boiling ranges. Other feed materials may comprise polymers, copolymers, interpolymers and crosspolymers of the above-mentioned olefins, such products being, for example, diisobutylene, triisobutylene, tetraisobutylene, the codimer, cotrimer and cotetramer of normal butylenes and isobutylene, the interdimer, intertrimer and intertetramer of isobutylene with pentenes, both branched and straight chain in character, the same products formed by condensing normal butylenes with branched or straight chain pentenes and similar high boiling mono-olefinic condensation products.

In these reactions the catalyst generally employed comprises a concentrated mineral acid as, for example, a sulfuric acid, a halogenated sulfuric acid, an acid of phosphorus or an equivalent acid. Other satisfactory catalysts are boron fluoride, the metal halides such as aluminum halide and iron halide, acid activated clays, as well as the mineral acids, employed in conjunction with various compounds of the fifth group of the periodic system, the aluminum halide-alkali metal halide double salt complexes, and various other similar catalysts. When employing sulfuric acid the reaction is generally conducted by utilizing an acid concentration above about 80%, preferably an acid concentration in the range from about 90% to about 100%.

The alkylation reaction is usually conducted at a relatively low temperature, that is, of the order of about 30° F. to about 100° F., preferably between about 40° F. and about 70° F. However, under certain conditions temperatures outside this range are employed. The time of the reaction varies considerably but in general is in the range from about 5 minutes to about 2½ hours, or longer, depending upon related operating conditions. Usually the reaction time is in the range from about 10 to about 60 minutes. Although the reaction may be carried out in the vapor phase the reaction is generally conducted in the liquid phase. In a liquid phase operation the pressures are at least sufficient to keep the respective reactants from vaporizing. Pressures of from about 0 to about 12 atmospheres or pressures as high as 100 atmospheres, depending upon the reaction temperature, are employed.

In these reactions although equal molecular quantities of isoparaffin and mono-olefin may be used it has been found desirable to maintain a substantial excess of the tertiary hydrocarbon in the reaction zone and to operate in a reaction medium containing an excess of the catalyst composition. For example, in an operation wherein isobutane or isopentane is employed as the isoparaffinic reactant, the molar excess ranges from about 1 to as high as 200 mols per mol of mono-olefins present.

In these operations carried out under the above-described conditions it has not been possible heretofore to secure any appreciable alkylation of ethylene. I have, however, now discovered that if a mineral acid be employed it is possible to alkylate ethylene providing the alkylation reaction be conducted in the presence of a higher boiling olefin as, for example, butylene, amylene, and the like.

My process may be readily understood by reference to the drawing illustrating an embodiment of the same. For purposes of description it is assumed that the feed gas comprises a gas secured from conventional refining operations and consists of hydrocarbon constituents containing from one to six and higher carbon atoms in the molecule. The feed gas is introduced into the bottom of absorption zone 2 by means of feed line 1. The feed gas flows upwardly through absorption zone 2 and countercurrently contacts downflowing absorption oil which is introduced into the top of the absorption zone by means of line 12. Temperature and pressure conditions are adjusted in zone 2 so as to absorb in the absorption oil all butane and higher boiling hydrocarbon. The absorption oil containing the absorbed constituents is removed from absorption zone 2 by means of line 3 and passed into distillation zone 4 wherein the absorbed constituents are removed from the oil. The constituents which are separated from the oil are removed overhead by means of line 20, condensed in cooling zone 21, and passed to separation zone 22 wherein uncondensed gases are separated from the condensate. The uncondensed gases are removed by means of line 23 and preferably recycled to absorption zone 2. The condensate is removed from separation zone 22 by means of line 5 and passed to distillation zone 24 wherein the same is distilled to segregate a residue gas which is removed by means of line 25, a propane-propylene fraction which is removed by means of line 26, a butane-butylene fraction which is removed by means of line 27, and a naphtha bottoms which is removed by means of line 28, which streams are handled as hereinafter described.

The vapors denuded of butane and higher boiling hydrocarbons are removed overhead from absorption zone 2 by means of line 29, are passed through separation zone 30, compressed in compressing zone 31, cooled in cooling zone 32, and introduced into absorption zone 9. These gases flow upwardly in absorption zone 9 and countercurrently contact a stream of absorption oil secured as hereinafter described, which stream is introduced into absorption zone 9 by means of line 10. Temperature and pressure conditions are adjusted so as to absorb propane and propylene in the absorption oil as it flows down through the absorption zone. The absorption oil in the bottom of zone 9 is heated by means of reboiler means 33 so as to separate propane-propylene constituents which are removed from zone 9 by means of line 34, cooled in cooling zone 35, and passed to separation zone 36. A propane-propylene vaporous fraction is removed by means of line 11, condensed in condenser 37, and withdrawn from the system as desired by means of line 38. The absorption oil, which may still contain propane-propylene constituents, is removed from reboiler 33 by means of line 39, cooled in cooling zone 40, and then introduced into the top of absorption zone 2 and handled as hereinbefore described. The gases comprising ethylene, methane, and the like, are removed overhead from absorption zone 9 by means of line 41, passed to separation zone 42 from which entrained liquid may be removed by means of line 43. The gases are compressed in compressing zone 44, cooled in cooling zone 45 and introduced into absorption zone 7 wherein the same countercurrently contact the absorption oil removed from zone 4. This absorption oil is cooled in cooling zone 46 and combined with makeup oil before introducing the same into the top of absorption zone 7 by means of line 6. Temperature and pressure conditions are adjusted to remove overhead methane and other gases by means of line 47 and to absorb in the oil ethane and ethylene. The absorption oil containing these constituents is treated in the bottom of zone 7 by means of heating zone 8 to remove the same from the oil, which constituents are removed by means of line 48, cooled in cooling zone 49, and passed to separation zone 50. Condensed constituents are removed from zone 50 by means of line 51 and combined with the absorption oil passing to zone 9 by means of line 10. The ethane-ethylene stream is removed from zone 50 by means of line 52.

The ethane-ethylene stream segregated by means of line 52 is passed into reaction zone 53 near the bottom of said zone by means of jets or equivalent means 54 and 76. Operating conditions are adjusted so that the bottom of zone 53 contains an acid phase. The butane-butylene stream removed from zone 24 by means of line 27 is combined with makeup isobutane which is introduced into the system by means of line 55 and the recycled isobutane which is separated as hereinafter described and which is introduced by means of line 56. This hydrocarbon phase is introduced into the top of reaction zone 53. Acid which is withdrawn from the bottom of zone 53 is recycled to the top of said zone in the hydrocarbon phase by means of line 57. Unreacted gaseous constituents are removed from zone 53 by means of line 58, cooled in cooling zone 59, and passed to separation zone 60. Unreacted constituents comprising methane and ethane are removed by means of line 61, while the condensate is recycled by means of line 62. Recycle in the hydrocarbon phase may be provided by withdrawing a portion of the same by means of line 63, and cooling the same in zone 64. The cooled phase is returned to zone 53 by means of line 62. The reaction product comprising the alkylate is withdrawn by means of line 74, passed into separation zone 65 where the acid is separated and removed by means of line 66. This acid may be withdrawn from the system by means of line 67 or recycled by means of line 68. The hydrocarbon phase comprising the alkylate is removed by means of line 69 and passed to distillation zone 70 wherein the alkylate is separated by means of line 71, the normal butane by means of line 72, and an ethane-ethylene stream by means of line 73. Isobutane is separated by means of line 56 and handled as hereinbefore described. Strong sulfuric acid is added as required to zone 53 through line 75.

The process of the present invention may be widely varied. It is to be understood that the respective zones may comprise any suitable number and arrangement of units. The invention essentially comprises alkylating ethylene by utilizing a mineral acid, isoparaffin and a quantity of a higher boiling olefin, preferably butylene. The acid preferably comprises sulfuric acid having a concentration in the range from about 90% to about 100%. The temperatures similarly may vary in the general range from about 30° F. to about 130° F. The concentration of inert constituents such as methane and ethane should be kept low in order to reduce the partial pressure exerted by these components. The partial pressure of ethylene should be relatively high, preferably in the range from 25 to 100 pounds per square inch or above, in order to promote a rapid rate of solution and reaction of this component. The operating pressure will depend upon temperature and concentration of the components, their partial pressure, the quantity and the quality of the products desired, and the relative cost of the various items of equipment; in view of these factors operating pressures in the range from 100 pounds to 500 pounds per square inch are considered representative of good commercial practice. Similarly the addition of butylene is preferably controlled in order to secure a desired result; a high concentration of butylene favoring alkylation of the isoparaffin by this component, a low concentration favoring alkylation by ethylene, and a still lower concentration being insufficient to induce alkylation. When a product containing 30 volume per cent or more of hexane fraction is desired it is preferable to use about 25 mols of ethylene per mol of butylene. It is preferable to withhold the higher olefin until the ethylene has dissolved and is in contact with isoparaffin and catalyst. It is preferable to add, for each mol of olefin consumed in the reaction, at least one mol but preferably five or more mols of isoparaffin.

In order to illustrate the invention further, the following example is given which should not be construed as limiting the same in any manner whatsoever:

*Example*

A number of operations were conducted in which feed mixtures comprising olefins were alkylated with tertiary hydrocarbons. The ratio of ethylene to butylene was varied. The results of these operations were as follows:

*Alkylation of isobutane with ethylene*

| | Operation | |
|---|---|---|
| | 1 | 2 |
| Temperature, °F | 70 | 70 |
| Pressure, lbs./sq. inch | 25–35 | 30–40 |
| Ethylene/butylene mol ratio | 0.66 | 2.0 |
| Isobutane/olefin ratio | 6.0 | 5.8 |
| Olefin feed composition: | | |
| Ethylene, wt. per cent | 9.1 | 23 |
| Butylenes, wt. per cent | 27.2 | 23 |
| Time of olefin addition, min | 90 | 90 |
| Time of additional stirring, min | 30 | 30 |
| $C_5+$ product: | | |
| Wt. per cent yield based on $C_4H_8$ | 224 | 360 |
| Wt. per cent yield based on total olefins | 168 | 180 |
| Wt. per cent yield based on $C_2H_4$ assuming theoretical yield based on $C_4H_8$ | 63 | 160 |
| Vol. per cent $C_5$ (50–105° F.) | 1.5 | 2.5 |
| Vol. per cent $C_6$ (105–165° F.) | 16.3 | 22.8 |
| Vol. per cent $C_7$ (165–180° F.) | 1.3 | 2.2 |
| Vol. per cent $C_8$ (180–265° F.) | 71.8 | 64.0 |
| Vol. per cent $C_9$ (above 265° F.) | 9.1 | 8.5 |

From the above it is apparent that appreciable alkylation of ethylene is secured. Furthermore, it is apparent that it is desirable to maintain an ethylene to butylene ratio above 1:1, preferably above 2:1.

What I claim as new and wish to protect by Letters Patent is:

1. A process for the alkylation of a low boiling isoparaffin with ethylene to produce high antiknock liquid hydrocarbons within the gasoline boiling range, which comprises contacting ethylene with at least an equi-molecular amount of the low boiling isoparaffin in the presence of strong sulfuric acid of alkylation strength at temperatures between 30° F. and 130° F. and with an amount of butylene such that the mol ratio of ethylene to butylene is at least 1:1 and not substantially greater than 25:1.

2. A process for the manufacture of high antiknock gasoline hydrocarbons from an olefin-containing gas, the olefin content of which consists essentially of ethylene, which comprises absorbing the ethylene in strong sulfuric acid, separating unabsorbed gas from the ethylene acid solution, adding isobutane to the ethylene acid absorption product and alkylating at a temperature between 30° F. and 130° F. the ethylene absorption product in this mixture in the presence of at least an equi-molecular amount of the isobutane and an amount of added butylene such that the mol ratio of ethylene to butylene is at least 1:1 and not substantially greater than 25:1.

3. A process for the manufacture of high antiknock gasoline hydrocarbons from a refinery gas consisting essentially of a mixture of $C_1$ to $C_4$ hydrocarbons, which comprises fractionating the gas to separate out a $C_2$ fraction containing ethylene and a $C_4$ fraction containing substantially all of the butylenes, alkylating the separated $C_2$ fraction at a temperature between 30° F. and 130° F. with strong sulfuric acid of alkylation strength in the presence of at least an equi-molecular amount of isobutane and with the addition of a sufficient proportion of said $C_4$ fraction to provide an amount of butylene such that the mol ratio of ethylene to butylene is at least 2:1 and not substantially greater than 25:1 and stabilizing the resulting alkylation products to separate out a $C_4$ fraction containing isobutane which is recycled to the alkylation reaction.

4. A process for the manufacture of high antiknock gasoline hydrocarbons from a refinery gas consisting essentially of a mixture of $C_1$ to $C_4$ hydrocarbons which comprises fractionating the gas to separate the same into a $C_2$ fraction containing ethylene and a $C_4$ fraction containing substantially all of the butylenes, contacting the separated $C_2$ fraction with strong sulfuric acid to absorb the ethylene and separate the same from ethane, alkylating the ethylene absorption product at a temperature between 30° F. and 130° F. in the presence of strong sulfuric acid of alkylation strength with at least an equi-molecular amount of isobutane and a sufficient proportion of the $C_4$ fraction to provide an amount of butylene such that the mol ratio of ethylene to butylene is at least 2:1 and not substantially greater than 25:1, separating the hydrocarbon alkylation products from used acid and stabilizing the hydrocarbon alkylation products to separate out a gaseous fraction containing isobutane which is recycled to the alkylation reaction.

5. A process for the alkylation of a low boiling isoparaffin with ethylene to produce high antiknock liquid hydrocarbons within the gasoline boiling range, which comprises contacting ethylene with at least an equi-molecular amount of the low boiling isoparaffin in the presence of strong sulfuric acid of alkylation strength at temperatures between 30° F. and 130° F. and in the presence of an added amount of butylene such that the mol ratio of ethylene to butylene is at least 1:1 and not substantially greater than 25:1.

6. A process for reacting ethylene with a saturated tertiary hydrocarbon which comprises contacting the ethylene in admixture with another olefin having at least 4 carbon atoms in its molecule, the mole ratio of the ethylene to said other olefin in the mixture being at least 1:1 and not substantially greater than 25:1, with said tertiary hydrocarbon in the presence of a mineral acid of alkylating strength under alkylating conditions.

7. A process according to claim 6 in which the mole ratio of ethylene to said other olefin is greater than 2:1 but not substantially greater than 25:1.

8. A process for reacting ethylene with a saturated tertiary hydrocarbon which comprises absorbing the ethylene in a mineral acid capable of functioning as an alkylating catalyst and contacting said mineral acid containing the dissolved ethylene with the tertiary hydrocarbon under alkylating conditions in the presence of an olefin containing at least 4 carbon atoms, there being provided not more than about 1 mole and not less than about 1/25 of a mole of said latter olefin for each mole of absorbed ethylene.

9. A process according to claim 8 in which there is less than 1/2 a mole but not substantially less than 1/25 of a mole of said latter olefin for each mole of absorbed ethylene.

10. A process according to claim 8 in which the mineral acid is sulfuric acid of the strength of between about 90% and 100%.

GEORGE T. ATKINS, Jr.